(12) United States Patent
Zheng et al.

(10) Patent No.: US 10,341,220 B2
(45) Date of Patent: Jul. 2, 2019

(54) VIRTUAL SHORTEST PATH TREE ESTABLISHMENT AND PROCESSING METHODS AND PATH COMPUTATION ELEMENT

(71) Applicant: Huawei Technologies Co., Ltd., Shenzhen (CN)

(72) Inventors: Haomian Zheng, Shenzhen (CN); Yi Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 390 days.

(21) Appl. No.: 15/357,761

(22) Filed: Nov. 21, 2016

(65) Prior Publication Data

US 2017/0078187 A1 Mar. 16, 2017

Related U.S. Application Data

(63) Continuation of application No. PCT/CN2014/078036, filed on May 21, 2014.

(51) Int. Cl.
*H04L 12/721* (2013.01)
*H04L 12/46* (2006.01)
*H04L 12/44* (2006.01)
*H04L 29/06* (2006.01)
*H04L 12/701* (2013.01)
*H04L 12/715* (2013.01)
(Continued)

(52) U.S. Cl.
CPC ............ *H04L 45/124* (2013.01); *H04L 12/44* (2013.01); *H04L 12/4641* (2013.01); *H04L 29/06* (2013.01); *H04L 45/00* (2013.01); *H04L 45/04* (2013.01); *H04L 45/12* (2013.01); *H04L 45/36* (2013.01); *H04L 45/48* (2013.01); *H04L 47/786* (2013.01); *H04L 47/826* (2013.01)

(58) Field of Classification Search
CPC .... H04L 29/08072; H04L 29/06; H04L 45/00
USPC .......................... 709/203, 220, 224, 226, 228
See application file for complete search history.

(56) References Cited

U.S. PATENT DOCUMENTS 7,746,873 B2 * 6/2010 Saito ................. H04L 29/12311
370/338
7,853,998 B2 * 12/2010 Blaisdell ............... H04L 63/102
713/153
(Continued)

FOREIGN PATENT DOCUMENTS

CN 101536375 A 9/2009
CN 101960801 A 1/2011
(Continued)

*Primary Examiner* — Khanh Q Dinh
(74) *Attorney, Agent, or Firm* — Leydig, Voit & Mayer, Ltd.

(57) ABSTRACT

The present application provides virtual shortest path tree establishment and processing methods and a path computation element, so as to improve a resource utilization rate in a process of establishing and processing a virtual shortest path tree. In a process of establishing the virtual shortest path tree, a cost of an established path from a root node (a destination node) to a leaf node is compared with a cost threshold, and a new path branch is added to the VSPT when the cost is less than the cost threshold. In a process of processing the virtual shortest path tree, a resource occupied by a path branch in the VSPT that does not belong to an optimal path is released after the optimal path is obtained.

14 Claims, 9 Drawing Sheets

(51) Int. Cl.
*H04L 12/753* (2013.01)
*H04L 12/915* (2013.01)
*H04L 12/911* (2013.01)

(56) References Cited

U.S. PATENT DOCUMENTS

| | | | |
|---|---|---|---|
| 9,131,367 B2* | 9/2015 | O'Neill | H04W 8/26 |
| 9,712,426 B2* | 7/2017 | Lu | H04L 45/16 |
| 2003/0223439 A1* | 12/2003 | O'Neill | H04W 8/08 370/402 |
| 2006/0101142 A1 | 5/2006 | Vasseur et al. | |
| 2006/0171320 A1 | 8/2006 | Vasseur et al. | |
| 2007/0280174 A1* | 12/2007 | Pun | H04L 45/36 370/338 |
| 2008/0240033 A1* | 10/2008 | O'Neill | H04W 8/08 370/329 |
| 2010/0039939 A1 | 2/2010 | Wang | |
| 2011/0044352 A1 | 2/2011 | Chaitou et al. | |
| 2011/0242995 A1 | 10/2011 | Zhang et al. | |
| 2013/0070752 A1 | 3/2013 | Dhruv et al. | |
| 2013/0227146 A1 | 8/2013 | Wang et al. | |
| 2014/0036871 A1* | 2/2014 | O'Neill | H04W 8/08 370/331 |
| 2015/0341255 A1 | 11/2015 | Lu et al. | |

FOREIGN PATENT DOCUMENTS

| | | |
|---|---|---|
| CN | 102469009 A | 5/2012 |
| CN | 103023774 A | 4/2013 |
| CN | 103023780 A | 4/2013 |
| EP | 2237501 A1 | 10/2010 |
| EP | 2640001 A1 | 9/2013 |

* cited by examiner

VIRTUAL SHORTEST PATH TREE ESTABLISHMENT AND PROCESSING METHODS AND PATH COMPUTATION ELEMENT

CROSS-REFERENCE TO RELATED APPLICATIONS

This application is a continuation of International Application No. PCT/CN2014/078036, filed on May 21, 2014, the disclosure of which is hereby incorporated by reference in its entirety.

TECHNICAL FIELD

The present application relates to the field of network technologies, and in particular, to virtual shortest path tree establishment and processing methods and a path computation element.

BACKGROUND

A bandwidth requirement is generated during an increase in an Internet Protocol service, and a static optical network cannot satisfy an existing requirement. Technologies such as an automatically switched optical network and general multiprotocol label switching develop rapidly based on this. The Internet Engineering Task Force (IETF) proposes a path computation element (PCE) to satisfy a path computation requirement in the technologies such as an automatically switched optical network and general multiprotocol label switching. A main function of the PCE is to perform centralized route computation in a management domain to avoid a resource conflict problem caused by distributed route computation.

A main operating process of the PCE is: After receiving a request of a path computation client (PCC), the PCE returns path information to the PCC according to a routing algorithm and a current available network resource.

After a network scale is enlarged, a single PCE cannot satisfy the path computation requirement. Therefore, a network needs to be divided into multiple management domains (hereinafter referred to as a domain), each management domain has a PCE responsible for path computation, and each PCE interacts interconnected routing information with each other according to a PCE protocol.

At present, when a multi-domain path is being computed, a backward recursive path computation (BRPC) solution may be used to generate a virtual shortest path tree (VSPT), and an optimal path is selected from the virtual shortest path tree to implement path establishment.

In an existing VSPT generation process, every time when a path section is being computed, a resource in a PCE of a corresponding domain needs to be reserved for the path section. When a network scale is relatively large and a quantity of involved domains is relatively large, the VSPT has many branches, and a corresponding resource is reserved on each branch. After a path is established, a reserved resource is not to be released to a resource pool for computation of another path until a specified duration ends. Therefore, in a large-scale multi-domain network, when a path is being computed, several multiples of resources may need to be reserved for a long time, causing low resource utilization efficiency. In particular, when there are many services on a multi-domain path and path computation is required frequently, it is likely to cause a relatively high network congestion rate.

SUMMARY

Embodiments of the present invention provide virtual shortest path tree establishment and processing methods and a path computation element, so as to improve a resource utilization rate in a process of establishing and processing a virtual shortest path tree.

According to a first aspect, an embodiment of the present invention provides a path computation element PCE, including:

a processing unit, configured to determine whether a cost of a path from a root node to a leaf node in a virtual shortest path tree VSPT obtained by a PCE of a downstream neighboring domain in a domain sequence is less than a cost threshold, where the root node is a destination node, the leaf node is a boundary node that is in the downstream neighboring domain and that has an inter-domain link with a domain in which a source node is located, the domain sequence is a sequence of domains passed from the source node to the destination node, the downstream refers to a direction from the source node to the destination node, and the PCE is a PCE of the domain in which the source node is located; and an execution unit, configured to add a path branch from the leaf node to the source node to the VSPT when the processing unit determines that the cost of the path from the root node to the leaf node is less than the cost threshold, so as to obtain a new VSPT.

With reference to the first aspect, in a first possible implementation manner, a receiving unit is further included, configured to:

receive a message that is sent by the PCE of the downstream neighboring domain and that carries the VSPT and the cost of the path from the root node to the leaf node in the VSPT, and send the VSPT and the cost of the path from the root node to the leaf node in the VSPT to the processing unit.

With reference to the first aspect or the first possible implementation manner, in a second possible implementation manner, the execution unit is further configured to:

select an optimal path from the source node to the destination node according to the new VSPT; and the PCE further includes a sending unit, configured to:

send, to the PCE of the downstream neighboring domain, a message that carries the optimal path selected by the execution unit.

With reference to the second possible implementation manner of the first aspect, in a third possible implementation manner, a resource release unit is further included, configured to:

after the execution unit selects the optimal path, release a resource occupied by a path branch in the new VSPT that does not belong to the optimal path and that is in the domain in which the source node is located or between the domain in which the source node is located and the downstream neighboring domain.

With reference to the third possible implementation manner of the first aspect, in a fourth possible implementation manner, the resource release unit is specifically configured to:

after the execution unit selects the optimal path and after a specified duration ends, release the resource occupied by the path branch in the new VSPT that does not belong to the optimal path and that is in the domain in which the source node is located or between the domain in which the source node is located and the downstream neighboring domain.

According to a second aspect, an embodiment of the present invention provides another path computation element PCE, including:

a processing unit, configured to determine whether a cost of a path from a root node to a leaf node in a virtual shortest path tree VSPT obtained by a PCE of a downstream neighboring domain in a domain sequence is less than a cost threshold, where the root node is a destination node, the leaf node is a boundary node that is in the downstream neighboring domain and that has an inter-domain link with a domain corresponding to the PCE, and the domain sequence is a sequence of domains passed from a source node to the destination node; and an execution unit, where the execution unit includes a first execution subunit, and the first execution subunit is configured to: when the processing unit determines that the cost of the path from the root node to the leaf node is less than the cost threshold, add, to the VSPT, a path branch from the leaf node to a boundary node that is in the domain corresponding to the PCE and that has an inter-domain link with an upstream neighboring domain in the domain sequence, so as to obtain a new VSPT; the downstream refers to a direction from the source node to the destination node, and the upstream refers to a direction from the destination node to the source node.

With reference to the second aspect, in a first possible implementation manner, a sending unit is further included, configured to:

send a first message to a PCE of the upstream neighboring domain, where the first message includes the new VSPT obtained by the first execution subunit and a cost of a path from the root node to a leaf node of the new VSPT; and a receiving unit is further included, configured to:

receive a second message sent by the PCE of the upstream neighboring domain, where the second message includes an optimal path from the source node to the destination node that is selected by a PCE of a domain in which the source node is located.

With reference to the first possible implementation manner of the second aspect, in a second possible implementation manner, the second message further includes a new VSPT obtained by the PCE of the domain in which the source node is located; and the execution unit further includes a second execution subunit, where the second execution subunit is configured to:

obtain the optimal path and the new VSPT obtained by the PCE of the domain in which the source node is located that are in the second message received by the receiving unit, and release a resource occupied by a path branch that does not belong to the optimal path and that is in the new VSPT obtained by the PCE of the domain in which the source node is located and that is in the domain corresponding to the PCE or between the domain corresponding to the PCE and the downstream neighboring domain.

With reference to the second possible implementation manner of the second aspect, in a third possible implementation manner, the second execution subunit is specifically configured to:

obtain the optimal path and the new VSPT obtained by the PCE of the domain in which the source node is located that are in the second message received by the receiving unit, and after a specified duration ends, release the resource occupied by the path branch that does not belong to the optimal path and that is in the new VSPT obtained by the PCE of the domain in which the source node is located and that is in the domain corresponding to the PCE or between the domain corresponding to the PCE and the downstream neighboring domain.

According to a third aspect, an embodiment of the present invention provides another path computation element PCE, including:

a processing unit, configured to obtain a virtual shortest path tree VSPT, and select an optimal path according to the VSPT, where a root node of the VSPT is a destination node, a leaf node of the VSPT is a source node, and the PCE is a PCE of a domain in which the source node is located; and an execution unit, configured to release, according to the VSPT and the optimal path that are obtained by the processing unit, a resource occupied by a path branch in the VSPT that does not belong to the optimal path and that is in the domain in which the source node is located or between the domain in which the source node is located and a downstream neighboring domain, where the downstream refers to a direction from the source node to the destination node.

With reference to the third aspect, in a first possible implementation manner, a sending unit is further included, configured to:

send, to a PCE of the downstream neighboring domain in a domain sequence, a message that carries the VSPT and the optimal path that are obtained by the processing unit, where the domain sequence is a sequence of domains passed from the source node to the destination node.

According to a fourth aspect, an embodiment of the present invention provides another path computation element PCE, including:

a receiving unit, configured to receive a third message sent by a PCE of an upstream neighboring domain in a domain sequence, where the third message includes a virtual shortest path tree VSPT and an optimal path from a source node to a destination node that are obtained by a PCE of a domain in which the source node is located, a root node of the VSPT is the destination node, a leaf node of the VSPT is the source node, and the domain sequence is a sequence of domains passed from the source node to the destination node; and an execution unit, configured to release, according to the VSPT and the optimal path that are carried in the third message received by the receiving unit, a resource occupied by a path branch in the VSPT that does not belong to the optimal path and that is in a domain corresponding to the PCE or between a domain corresponding to the PCE and a downstream neighboring domain in the domain sequence, where the downstream refers to a direction from the source node to the destination node, and the upstream refers to a direction from the destination node to the source node.

With reference to the fourth aspect, in a first possible implementation manner, a sending unit is further included, configured to:

send, to a PCE of the downstream neighboring domain in the domain sequence according to the VSPT and the optimal path that are carried in the third message received by the receiving unit, a message that carries the VSPT and the optimal path.

According to a fifth aspect, an embodiment of the present invention provides another path computation element PCE, including:

a receiving unit, configured to receive a fourth message sent by a PCE of an upstream neighboring domain in a domain sequence, where the fourth message includes a virtual shortest path tree VSPT and an optimal path from a source node to a destination node that are obtained by a PCE of a domain in which the source node is located, a root node of the VSPT is the destination node, a leaf node of the VSPT is the source node, the domain sequence is a sequence of domains passed from the source node to the destination node, and the PCE is a PCE of a domain in which the destination node is located; and an execution unit, configured to obtain the VSPT and the optimal path that are carried in the fourth message received by the receiving unit, and release a resource occupied by a path branch in the VSPT that does not belong to the optimal path and that is in the domain in which the destination node is located; the upstream refers to a direction from the destination node to the source node.

According to a sixth aspect, an embodiment of the present invention provides a virtual shortest path tree establishment method, including:

determining, by a path computation element PCE of a domain in which a source node is located, whether a cost of a path from a root node to a leaf node in a virtual shortest path tree VSPT obtained by a PCE of a downstream neighboring domain in a domain sequence is less than a cost threshold, where the root node is a destination node, the leaf node is a boundary node that is in the downstream neighboring domain and that has an inter-domain link with the domain in which the source node is located, and the domain sequence is a sequence of domains passed from the source node to the destination node; and adding, by the PCE of the domain in which the source node is located, a path branch from the leaf node to the source node to the VSPT if the cost of the path from the root node to the leaf node is less than the cost threshold, so as to obtain a new VSPT, where the downstream refers to a direction from the source node to the destination node.

With reference to the sixth aspect, in a first possible implementation manner, the method further includes:

receiving, by the PCE of the domain in which the source node is located, a message that is sent by the PCE of the downstream neighboring domain and that carries the VSPT and the cost of the path from the root node to the leaf node in the VSPT.

With reference to the sixth aspect or the first possible implementation manner, in a second possible implementation manner, the method further includes:

selecting, by the PCE of the domain in which the source node is located, an optimal path from the source node to the destination node according to the new VSPT, and sending, to the PCE of the downstream neighboring domain, a message that carries the optimal path.

With reference to the second possible implementation manner of the sixth aspect, in a third possible implementation manner, the method further includes:

after the PCE of the domain in which the source node is located selects the optimal path, releasing a resource occupied by a path branch in the new VSPT that does not belong to the optimal path and that is in the domain in which the source node is located or between the domain in which the source node is located and the downstream neighboring domain.

With reference to the third possible implementation manner of the sixth aspect, in a fourth possible implementation manner, the method specifically includes:

after the PCE of the domain in which the source node is located selects the optimal path and after a specified duration ends, releasing the resource occupied by the path branch in the new VSPT that does not belong to the optimal path and that is in the domain in which the source node is located or between the domain in which the source node is located and the downstream neighboring domain.

According to a seventh aspect, an embodiment of the present invention provides a virtual shortest path tree establishment method, including:

determining, by a first path computation element PCE, whether a cost of a path from a root node to a leaf node in a virtual shortest path tree VSPT obtained by a PCE of a downstream neighboring domain in a domain sequence is less than a cost threshold, where the root node is a destination node, the leaf node is a boundary node that is in the downstream neighboring domain and that has an inter-domain link with a domain corresponding to the first PCE, and the domain sequence is a sequence of domains passed from a source node to the destination node; and if the cost of the path from the root node to the leaf node is less than the cost threshold, adding, by the first PCE and to the VSPT, a path branch from the leaf node to a boundary node that is in the domain corresponding to the first PCE and that has an inter-domain link with an upstream neighboring domain in the domain sequence, so as to obtain a new VSPT, where the downstream refers to a direction from the source node to the destination node, and the upstream refers to a direction from the destination node to the source node.

With reference to the seventh aspect, in a first possible implementation manner, the method further includes:

sending, by the first PCE, a first message to a PCE of the upstream neighboring domain, where the first message includes the new VSPT and a cost of a path from the root node to a leaf node of the new VSPT; and receiving, by the first PCE, a second message sent by the PCE of the upstream neighboring domain, where the second message includes an optimal path from the source node to the destination node that is selected by a PCE of a domain in which the source node is located.

With reference to the first possible implementation manner of the seventh aspect, in a second possible implementation manner, the second message further includes a new VSPT obtained by the PCE of the domain in which the source node is located; and the method further includes:

obtaining, by the first PCE, the optimal path in the second message, and releasing a resource occupied by a path branch that does not belong to the optimal path and that is in the new VSPT obtained by the PCE of the domain in which the source node is located and that is in the domain corresponding to the first PCE or between the domain corresponding to the first PCE and the downstream neighboring domain.

With reference to the second possible implementation manner of the seventh aspect, in a third possible implementation manner, the method specifically includes:

after the first PCE obtains the optimal path in the second message and after a specified duration ends, releasing the resource occupied by the path branch that does not belong to the optimal path and that is in the new VSPT obtained by the PCE of the domain in which the source node is located and that is in the domain corresponding to the first PCE or between the domain corresponding to the first PCE and the downstream neighboring domain.

According to an eighth aspect, an embodiment of the present invention provides a virtual shortest path tree processing method, including:

obtaining, by a path computation element PCE of a domain in which a source node is located, a virtual shortest path tree VSPT, and selecting an optimal path according to the VSPT, where a root node of the VSPT is a destination node, and a leaf node of the VSPT is the source node; and releasing a resource occupied by a path branch in the VSPT that does not belong to the optimal path and that is in the domain in which the source node is located or between the domain in which the source node is located and a downstream neighboring domain, where the downstream refers to a direction from the source node to the destination node.

With reference to the eighth aspect, in a first possible implementation manner, the method further includes:

sending, by the PCE of the domain in which the source node is located and to a PCE of the downstream neighboring domain in a domain sequence, a message that carries the VSPT and the optimal path, where the domain sequence is a sequence of domains passed from the source node to the destination node.

According to a ninth aspect, an embodiment of the present invention provides a virtual shortest path tree processing method, including:

receiving, by a first path computation element PCE, a third message sent by a PCE of an upstream neighboring domain in a domain sequence, where the third message includes a virtual shortest path tree VSPT and an optimal path from a source node to a destination node that are obtained by a PCE of a domain in which the source node is located, a root node of the VSPT is the destination node, a leaf node of the VSPT is the source node, and the domain sequence is a sequence of domains passed from the source node to the destination node; and releasing, by the first PCE, a resource occupied by a path branch in the VSPT that does not belong to the optimal path and that is in a domain corresponding to the first PCE or between a domain corresponding to the first PCE and a downstream neighboring domain in the domain sequence, where the downstream refers to a direction from the source node to the destination node, and the upstream refers to a direction from the destination node to the source node.

With reference to the ninth aspect, in a first possible implementation manner, the method further includes:

sending, by the first PCE and to a PCE of the downstream neighboring domain in the domain sequence, a message that carries the VSPT and the optimal path.

According to a tenth aspect, an embodiment of the present invention provides a virtual shortest path tree processing method, including:

receiving, by a path computation element PCE of a domain in which a destination node is located, a fourth message sent by a PCE of an upstream neighboring domain in a domain sequence, where the fourth message includes a virtual shortest path tree VSPT and an optimal path from a source node to the destination node that are obtained by a PCE of a domain in which the source node is located, a root node of the VSPT is the destination node, a leaf node of the VSPT is the source node, and the domain sequence is a sequence of domains passed from the source node to the destination node; and releasing, by the PCE of the domain in which the destination node is located, a resource occupied by a path branch in the VSPT that does not belong to the optimal path and that is in the domain in which the destination node is located, where the upstream refers to a direction from the destination node to the source node.

Based on the foregoing technical solutions, in the VSPT establishment method provided by the embodiments of the present invention, in a process of establishing a VSPT, path branches in the established VSPT are reduced by comparing a cost of an established path from a root node (a destination node) to a leaf node with a preset cost threshold, so as to reduce occupied resources and improve a resource utilization rate.

Based on the foregoing technical solutions, in the VSPT processing method provided by the embodiments of the present invention, a resource occupied by a path branch that is in an established VSPT and irrelevant to an optimal path is immediately released after the optimal path is obtained, so as to reduce a resource occupation time and improve the resource utilization rate.

DESCRIPTION OF EMBODIMENTS

To make the objectives, technical solutions, and advantages of the present invention clearer, the following further describes the present invention in detail with reference to the accompanying drawings.

In the following embodiments, downstream refers to a direction from a source node to a destination node, and upstream refers to a direction from a destination node to a source node. A domain sequence is a sequence of domains passed from a source node to a destination node.

In the following embodiments, a message sent from downstream to upstream may be a path computation request (PCReq) message in the Path Computation Element Communication Protocol (PCEP), a message sent from upstream to downstream may be a path computation reply (PCRep) message in the PCEP protocol. An explicit route object in the PCRep or PCReq message may carry a VSPT. Further, the explicit route object in the PCRep or PCReq message may be expanded to carry a path cost of each path from a root node to a leaf node in the VSPT.

In a VSPT establishment process provided by the present invention, path branches in an established VSPT are reduced by comparing a cost of an established path from a root node (a destination node) to a leaf node with a preset cost threshold, so as to reduce occupied resources and improve a resource utilization rate.

Figure 1:
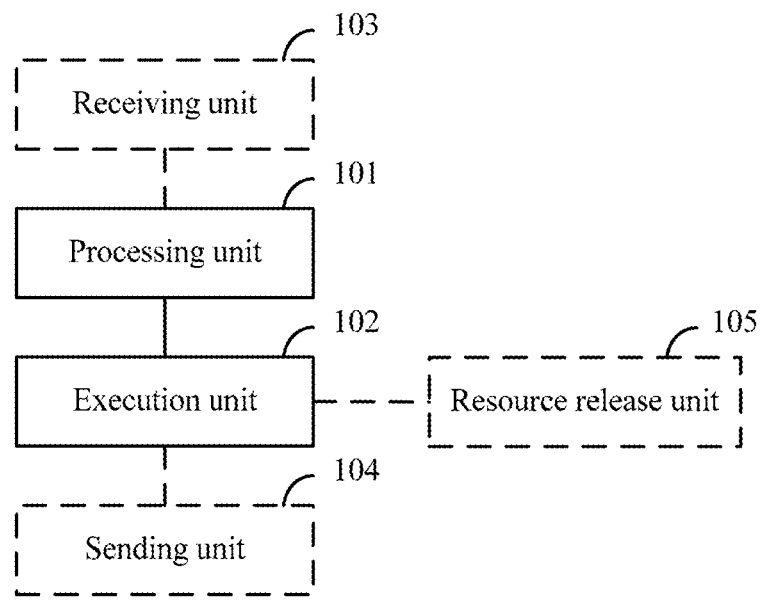
FIG. 1 is a schematic structural diagram of a PCE according to an embodiment of the present invention.

A first embodiment of the present invention provides a PCE. The PCE is a PCE of a domain in which a source node is located. As shown in FIG. 1, the PCE mainly includes:

a processing unit 101, configured to determine whether a cost of a path from a root node to a leaf node in a VSPT obtained by a PCE of a downstream neighboring domain in a domain sequence is less than a cost threshold, where the root node is a destination node, the leaf node is a boundary node that is in the downstream neighboring domain and that has an inter-domain link with the domain in which the source node is located;

an execution unit 102, configured to add a path branch from the leaf node to the source node to the VSPT when the processing unit 101 determines that the cost of the path from the root node to the leaf node is less than the cost threshold, so as to obtain a new VSPT.

The PCE provided by this embodiment compares a cost of a path from a root node to a leaf node in an established VSPT with a preset cost threshold, and when the cost is not less than the cost threshold, stops growth of the path corresponding to the leaf node, so that a resource that needs to be occupied to generate a new path branch is saved, resource occupation is reduced, and a resource utilization rate is improved.

A complete VSPT may be obtained after the PCE of the domain in which the source node is located adds the path branch from the leaf node to the source node to the VSPT.

Preferably, the PCE further includes a receiving unit 103, configured to:

receive a message that is sent by the PCE of the downstream neighboring domain and that carries the VSPT and the cost of the path from the root node to the leaf node in the VSPT, and send the VSPT and the cost of the path from the root node to the leaf node in the VSPT to the processing unit 101.

Preferably, the execution unit 102 is further configured to:

select an optimal path from the source node to the destination node according to the new VSPT.

A manner of selecting an optimal path is not an issue on which the present invention focuses, and the optimal path may be obtained by using an existing optimal path acquiring manner, which is not limited by the present invention.

Corresponding to the preferable implementation manner, the PCE further includes a sending unit 104, configured to: send, to the PCE of the downstream neighboring domain, a message that carries the optimal path selected by the execution unit 102.

Preferably, a resource release unit 105 is further included, configured to:

after the execution unit 102 selects the optimal path, release a resource occupied by a path branch in the new VSPT that does not belong to the optimal path and that is in the domain in which the source node is located or between the domain in which the source node is located and the downstream neighboring domain. During specific implementation, the released resource is updated to a traffic engineering database (TED) of the PCE.

The resource release unit 105 releases a resource in the following two manners, which are specifically:

In a first manner, after the execution unit 102 selects the optimal path and after a specified duration ends, the resource release unit 105 releases a resource occupied by a path branch in the new VSPT that does not belong to the optimal path and that is in the domain in which the source node is located or between the domain in which the source node is located and the downstream neighboring domain.

In a second implementation manner, after the execution unit 102 selects the optimal path, the resource release unit 105 immediately releases a resource occupied by a path branch in the new VSPT that does not belong to the optimal path and that is in the domain in which the source node is located or between the domain in which the source node is located and the downstream neighboring domain. In this implementation manner, after obtaining an optimal path, the PCE immediately releases a resource occupied by a path branch that does not belong to the optimal path; the resource is released immediately instead of after a specified duration ends, so that a resource occupation time is further shortened.

Figure 2:
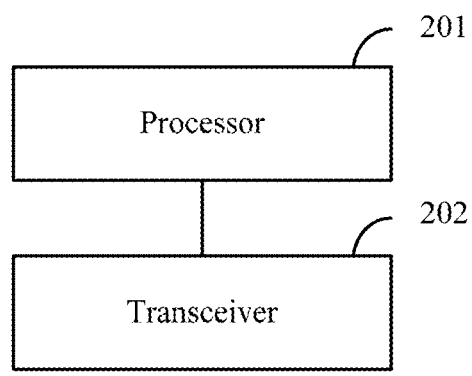
FIG. 2 is a schematic structural diagram of another PCE according to an embodiment of the present invention.

Corresponding to the PCE provided by the first embodiment, in a second embodiment of the present invention, a PCE is further provided, and the PCE is a PCE of a domain in which a source node is located. As shown in FIG. 2, the PCE mainly includes:

a processor 201, configured to: determine whether a cost of a path from a root node to a leaf node in a VSPT obtained by a PCE of a downstream neighboring domain in a domain sequence is less than a cost threshold, and when determining that the cost of the path from the root node to the leaf node is less than the cost threshold, add a path branch from the leaf node to the source node to the VSPT, so as to obtain a new VSPT, where the root node is a destination node, the leaf node is a boundary node that is in the downstream neighboring domain and that has an inter-domain link with the domain in which the source node is located.

A transceiver 202 is further included, configured to receive a message that is sent by the PCE of the downstream neighboring domain and that carries the VSPT and the cost of the path from the root node to the leaf node in the VSPT, and send the VSPT and the cost of the path from the root node to the leaf node in the VSPT to the processor 201.

Preferably, the processor 201 selects an optimal path from the source node to the destination node according to the new VSPT, and instructs the transceiver 202 to send, to the PCE of the downstream neighboring domain, a message that carries the optimal path selected by the processor 201.

More preferably, after selecting the optimal path, the processor 201 releases a resource occupied by a path branch in the new VSPT that does not belong to the optimal path and that is in the domain in which the source node is located or between the domain in which the source node is located and the downstream neighboring domain.

During specific implementation, the released resource is updated to a traffic engineering database (TED) of the PCE.

The processor 201 releases a resource in the following two manners, which are specifically:

In a first manner, after selecting the optimal path, the processor 201 releases, after a specified duration ends, a resource occupied by a path branch in the new VSPT that does not belong to the optimal path and that is in the domain in which the source node is located or between the domain in which the source node is located and the downstream neighboring domain.

In a second implementation manner, after selecting the optimal path, the processor 201 immediately releases a resource occupied by a path branch in the new VSPT that does not belong to the optimal path and that is in the domain in which the source node is located or between the domain in which the source node is located and the downstream neighboring domain. In this implementation manner, after obtaining an optimal path, the PCE immediately releases a resource occupied by a path branch that does not belong to the optimal path; the resource is released immediately instead of after a specified duration ends, so that a resource occupation time is further shortened.

Figure 3:
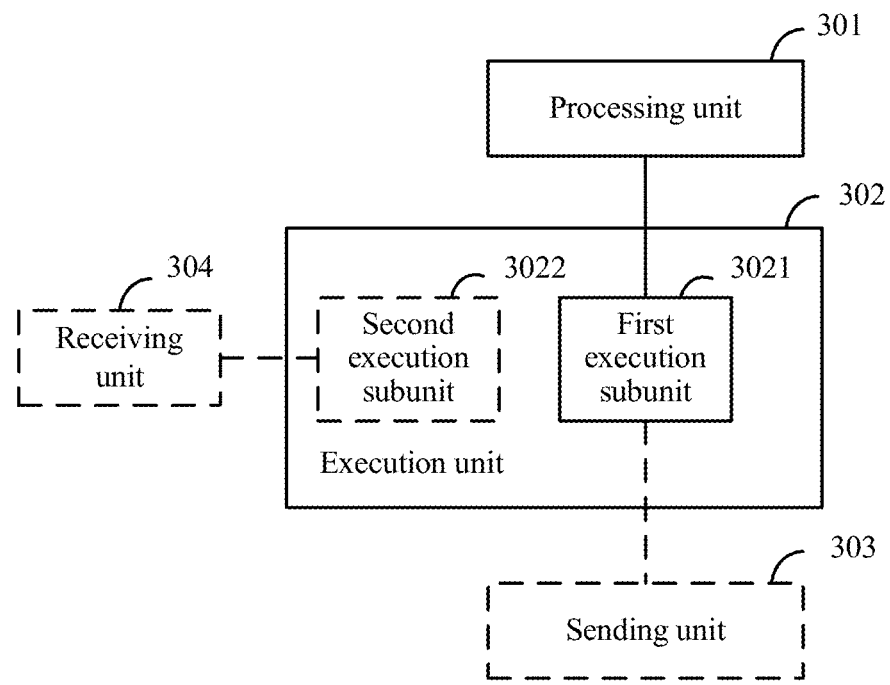
FIG. 3 is a schematic structural diagram of a PCE according to an embodiment of the present invention.

In a third embodiment of the present invention, another PCE is provided, and the PCE is configured to manage a resource of each node in an intermediate domain other than domains in which a source node or a destination node is located. As shown in FIG. 3, the PCE mainly includes:

a processing unit 301, configured to determine whether a cost of a path from a root node to a leaf node in a VSPT obtained by a PCE of a downstream neighboring domain in a domain sequence is less than a cost threshold, where the root node is a destination node, the leaf node is a boundary node that is in the downstream neighboring domain and that has an inter-domain link with a domain corresponding to the PCE; and an execution unit 302, where the execution unit 302 includes a first execution subunit 3021, and the first execution subunit 3021 is configured to: when the processing unit 301 determines that the cost of the path from the root node to the leaf node is less than the cost threshold, add, to the VSPT, a path branch from the leaf node to a boundary node that is in the domain corresponding to the PCE and that has an inter-domain link with an upstream neighboring domain in the domain sequence, so as to obtain a new VSPT.

The PCE provided by this embodiment compares a cost of a path from a root node to a leaf node in an established VSPT with a cost threshold, and when the cost is not less than the cost threshold, stops growth of the path corresponding to the leaf node, so that a resource that needs to be occupied to generate a new path branch is saved, the resource may be used by another VSPT, resource occupation is reduced, and a resource utilization rate is improved.

Preferably, a sending unit 303 is further included, configured to:

send a first message to a PCE of the upstream neighboring domain, where the first message includes the new VSPT obtained by the first execution subunit 3021 and a cost of a path from the root node to a leaf node of the new VSPT.

Preferably, a receiving unit 304 is further included, configured to:

receive a second message sent by the PCE of the upstream neighboring domain, where the second message includes an optimal path from the source node to the destination node that is selected by a PCE of a domain in which the source node is located.

Preferably, the second message further includes a new VSPT obtained by the PCE of the domain in which the source node is located.

Preferably, the execution unit 302 further includes a second execution subunit 3022, where the second execution subunit 3022 is configured to: obtain the optimal path and the new VSPT obtained by the PCE of the domain in which the source node is located that are in the second message received by the receiving unit 304, and release a resource occupied by a path branch that does not belong to the optimal path and that is in the new VSPT obtained by the PCE of the domain in which the source node is located and that is in the domain corresponding to the PCE or between the domain corresponding to the PCE and the downstream neighboring domain.

During specific implementation, the released resource is updated to a traffic engineering database (TED) of the PCE.

Preferably, the PCE releases a resource mainly in the following two processing manners:

In a first implementation manner, the second execution subunit 3022 obtains the optimal path and the new VSPT obtained by the PCE of the domain in which the source node is located that are in the second message received by the receiving unit 304, and after a specified duration ends, releases a resource occupied by a path branch that does not belong to the optimal path and that is in the new VSPT obtained by the PCE of the domain in which the source node is located and that is in the domain corresponding to the PCE or between the domain corresponding to the PCE and the downstream neighboring domain.

In a second implementation manner, the second execution subunit 3022 obtains the optimal path and the new VSPT obtained by the PCE of the domain in which the source node is located that are in the second message received by the receiving unit 304, and immediately releases a resource occupied by a path branch that does not belong to the optimal path and that is in the new VSPT obtained by the PCE of the domain in which the source node is located and that is in the domain corresponding to the PCE or between the domain corresponding to the PCE and the downstream neighboring domain; the resource is released immediately instead of after a specified duration ends, so that a resource occupation time is further shortened.

Figure 4:
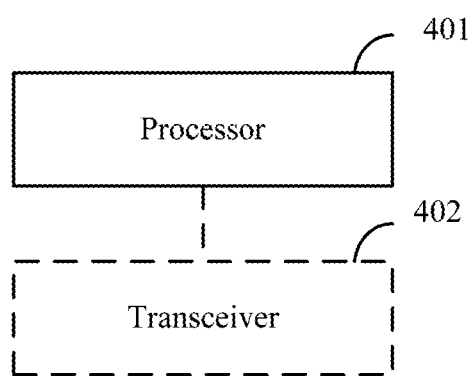
FIG. 4 is a schematic structural diagram of another PCE according to an embodiment of the present invention.

Corresponding to the PCE provided by the third embodiment, in a fourth embodiment of the present invention, another PCE is further provided, and the PCE is configured to manage a resource of each node in an intermediate domain other than domains in which a source node or a destination node is located. As shown in FIG. 4, the PCE mainly includes:

a processor 401, configured to: determine whether a cost of a path from a root node to a leaf node in a VSPT obtained by a PCE of a downstream neighboring domain in a domain sequence is less than a cost threshold, and when determining that the cost of the path from the root node to the leaf node is less than the cost threshold, add a path branch from the leaf node to a boundary node that is in a domain corresponding to the PCE and that has an inter-domain link with an upstream neighboring domain in the domain sequence, so as to obtain a new VSPT.

The root node is a destination node, and the leaf node is a boundary node that is in the downstream neighboring domain and that has an inter-domain link with the domain corresponding to the PCE.

Preferably, a transceiver 402 is further included, configured to: send a first message to a PCE of the upstream neighboring domain, where the first message includes the new VSPT obtained by the processor 401 and a cost of a path from the root node to a leaf node of the new VSPT; and receive a second message sent by the PCE of the upstream neighboring domain, where the second message includes an optimal path from the source node to the destination node that is selected by a PCE of a domain in which the source node is located.

More preferably, the second message further includes a new VSPT obtained by the PCE of the domain in which the source node is located.

The processor 401 obtains the optimal path and the new VSPT obtained by the PCE of the domain in which the source node is located that are in the second message received by the transceiver 402, and releases a resource occupied by a path branch that does not belong to the optimal path and that is in the new VSPT obtained by the PCE of the domain in which the source node is located and that is in the domain corresponding to the PCE or between the domain corresponding to the PCE and the downstream neighboring domain.

During specific implementation, the released resource is updated to a traffic engineering database (TED) of the PCE.

Preferably, the PCE releases a resource mainly in the following two processing manners:

In a first implementation manner, the processor obtains the optimal path and the new VSPT obtained by the PCE of the domain in which the source node is located that are in the second message, and after a specified duration ends, releases a resource occupied by a path branch that does not belong to the optimal path and that is in the new VSPT obtained by the PCE of the domain in which the source node is located and that is in the domain corresponding to the PCE or between the domain corresponding to the PCE and the downstream neighboring domain.

In a second implementation manner, the processor obtains the optimal path and the new VSPT obtained by the PCE of the domain in which the source node is located that are in the second message, and immediately releases a resource occupied by a path branch that does not belong to the optimal path and that is in the new VSPT obtained by the PCE of the domain in which the source node is located and that is in the domain corresponding to the PCE or between the domain corresponding to the PCE and the downstream neighboring domain; the resource is released immediately instead of after a specified duration ends, so that a resource occupation time is further shortened.

Figure 5:
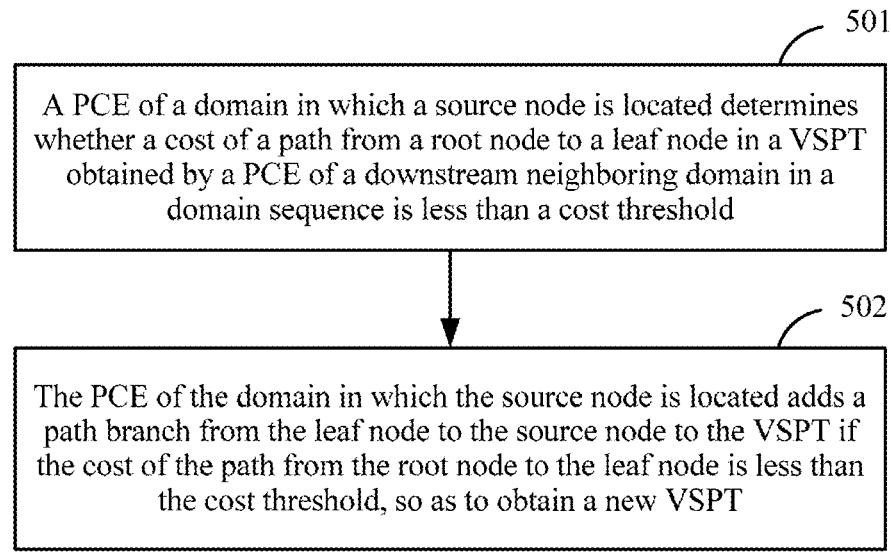
FIG. 5 is a schematic flowchart of a VSPT establishment method according to an embodiment of the present invention.

Based on the PCEs provided by the first and the third embodiments, or based on the PCEs provided by the second and the fourth embodiments, in a fifth embodiment of the present invention, as shown in FIG. 5, a detailed process of establishing a VSPT by a PCE of a domain in which a source node is located is as follows:

Step 501: The PCE of the domain in which the source node is located determines whether a cost of a path from a root node to a leaf node in a VSPT obtained by a PCE of a downstream neighboring domain in a domain sequence is less than a cost threshold.

The root node is a destination node, and the leaf node is a boundary node that is in the downstream neighboring domain and that has an inter-domain link with the domain in which the source node is located.

Step 502: The PCE of the domain in which the source node is located adds a path branch from the leaf node to the source node to the VSPT if the cost of the path from the root node to the leaf node is less than the cost threshold, so as to obtain a new VSPT.

During specific implementation, if the cost of the path from the root node to the leaf node is not less than the cost threshold, establishment of a corresponding path branch for the leaf node is stopped.

According to the VSPT establishment method provided by this embodiment, when determining that a cost of a path from a root node to a leaf node in an established VSPT transferred by a downstream neighboring domain is not less than a preset cost threshold, a PCE of a domain in which a source node is located stops growth of the path corresponding to the leaf node, so that a resource that needs to be occupied to generate the path branch is saved, the resource may be used by another VSPT, resource occupation is reduced, and a resource utilization rate is improved.

Preferably, the PCE of the domain in which the source node is located receives a message that is sent by the PCE of the downstream neighboring domain and that carries the VSPT and the cost of the path from the root node to the leaf node in the VSPT.

Preferably, the PCE of the domain in which the source node is located selects an optimal path from the source node to the destination node according to the new VSPT, and sends, to the PCE of the downstream neighboring domain, a message that carries the optimal path.

In a practical application, a manner of selecting an optimal path according to a VSPT is not an issue on which the present invention focuses, and the optimal path may be obtained by using an existing optimal path acquiring manner, which is not limited by the present invention.

Preferably, after selecting the optimal path, the PCE of the domain in which the source node is located releases a resource occupied by a path branch in the new VSPT that does not belong to the optimal path and that is in the domain in which the source node is located or between the domain in which the source node is located and the downstream neighboring domain.

During specific implementation, the released resource is updated to a traffic engineering database (TED) of the PCE.

Preferably, after obtaining the optimal path, the PCE of the domain in which the source node is located releases a resource that is irrelevant to the optimal path specifically in the following two implementation manners:

In a first implementation manner, after selecting the optimal path, the PCE of the domain in which the source node is located releases, after a specified duration ends, a resource occupied by a path branch in the new VSPT that does not belong to the optimal path and that is in the domain in which the source node is located or between the domain in which the source node is located and the downstream neighboring domain. In this implementation manner, after obtaining an optimal path, the PCE passively releases, after a specified duration ends, a resource occupied by a path branch that does not belong to the optimal path.

In a second implementation manner, after selecting the optimal path, the PCE immediately releases a resource occupied by a path branch in the new VSPT that does not belong to the optimal path and that is in the domain in which the source node is located or between the domain in which the source node is located and the downstream neighboring domain; the resource is released immediately instead of after a specified duration ends, so that a resource occupation time is further shortened.

Preferably, after the PCE releases the resource occupied by the path branch, the released resource is updated to a traffic engineering database (TED) of the PCE.

Figure 6:
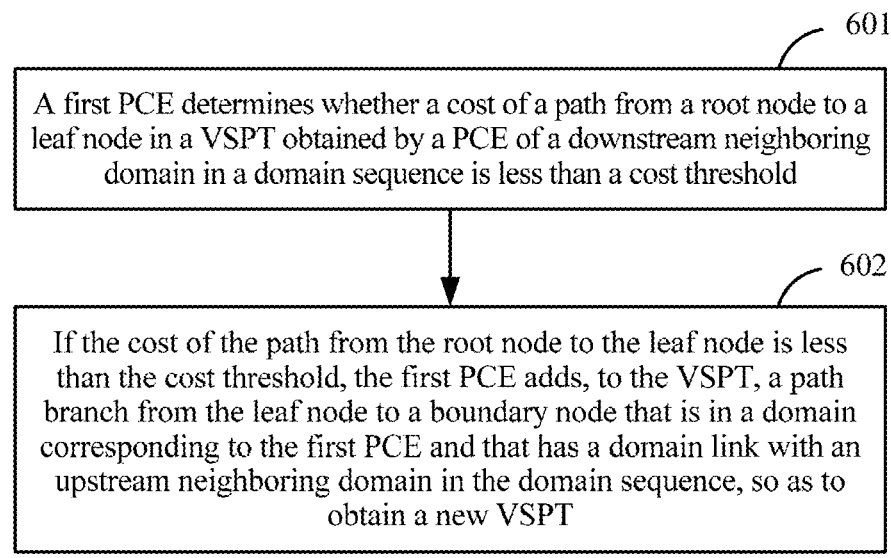
FIG. 6 is a schematic flowchart of another VSPT establishment method according to an embodiment of the present invention.

Based on the PCEs provided by the first and the third embodiments, or based on the PCEs provided by the second and the fourth embodiments, in a sixth embodiment of the present invention, as shown in FIG. 6, a detailed process of establishing a VSPT by a PCE of an intermediate domain other than domains in which a source node or a destination node is located is as follows:

Step 601: A first PCE determines whether a cost of a path from a root node to a leaf node in a VSPT obtained by a PCE of a downstream neighboring domain in a domain sequence is less than a cost threshold.

The root node is a destination node, and the leaf node is a boundary node that is in the downstream neighboring domain and that has an inter-domain link with a domain corresponding to the first PCE.

Step 602: If the cost of the path from the root node to the leaf node is less than the cost threshold, the first PCE adds, to the VSPT, a path branch from the leaf node to a boundary node that is in a domain corresponding to the first PCE and that has an inter-domain link with an upstream neighboring domain in the domain sequence, so as to obtain a new VSPT.

During specific implementation, if the cost of the path from the root node to the leaf node is not less than the cost threshold, establishment of a corresponding path branch for the leaf node is stopped.

According to the VSPT establishment method provided by this embodiment, when determining that a cost of a path from a root node to a leaf node in an established VSPT transferred by a downstream neighboring domain is not less than a preset cost threshold, a PCE of an intermediate domain other than domains in which a source node or a destination node is located stops growth of the path corresponding to the leaf node, so that a resource that needs to be occupied to generate the path branch is saved, the resource may be used by another VSPT, resource occupation is reduced, and a resource utilization rate is improved.

Preferably, the first PCE sends a first message to a PCE of the upstream neighboring domain, where the first message includes the new VSPT and a cost of a path from the root node to a leaf node of the new VSPT; and the first PCE receives a second message sent by the PCE of the upstream neighboring domain, where the second message includes an optimal path from the source node to the destination node that is selected by a PCE of a domain in which the source node is located.

More preferably, the second message further includes a new VSPT obtained by the PCE of the domain in which the source node is located.

The first PCE obtains the optimal path in the second message, and releases a resource occupied by a path branch that does not belong to the optimal path and that is in the new VSPT obtained by the PCE of the domain in which the source node is located and that is in the domain corresponding to the first PCE or between the domain corresponding to the first PCE and the downstream neighboring domain.

During specific implementation, the released resource is updated to a traffic engineering database (TED) of the PCE.

Preferably, the first PCE releases a resource that is irrelevant to the optimal path specifically in the following two implementation manners:

In a first implementation manner, after obtaining the optimal path in the second message, the first PCE releases, after a specified duration ends, a resource occupied by a path branch that does not belong to the optimal path and that is in the new VSPT obtained by the PCE of the domain in which the source node is located and that is in the domain corresponding to the first PCE or between the domain corresponding to the first PCE and the downstream neighboring domain. In this implementation manner, after a specified duration ends, the first PCE passively releases a resource occupied by a path branch that does not belong to an optimal path.

In a second implementation manner, after obtaining the optimal path in the second message, the first PCE immediately releases a resource occupied by a path branch that does not belong to the optimal path and that is in the new VSPT obtained by the PCE of the domain in which the source node is located and that is in the domain corresponding to the first PCE or between the domain corresponding to the first PCE and the downstream neighboring domain; the resource is released immediately instead of after a specified duration ends, so that a resource occupation time is further shortened.

Preferably, when determining that the cost of the path from the root node to the leaf node in the VSPT obtained by the PCE of the downstream neighboring domain in the domain sequence is not less than the cost threshold, the first PCE adds an end mark to the path whose cost is not less than the cost threshold, and the PCE of the upstream domain may determine, according to the end mark, that establishment of the path branch does not need to be continued.

The following describes in detail, by using two specific embodiments, the VSPT establishment and resource release processes provided by the foregoing first to sixth embodiments of the present invention.

Figure 7:
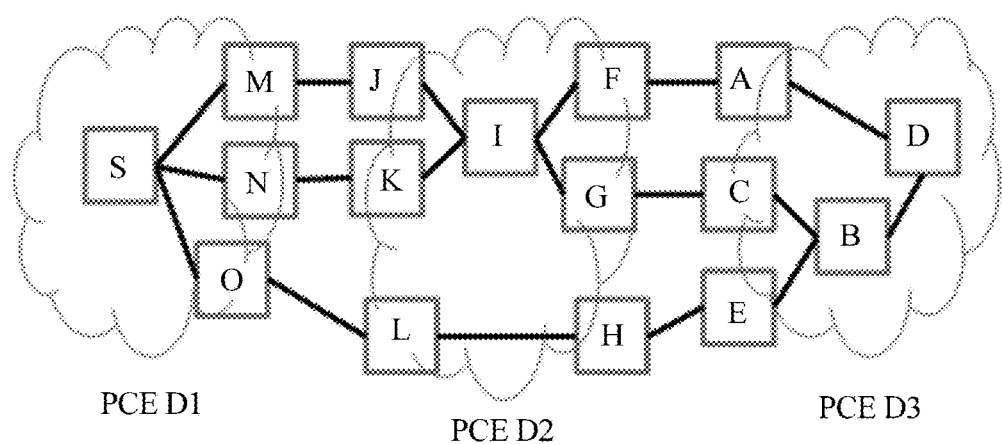
FIG. 7 is an exemplary schematic diagram of a multi-domain network.

In a first specific embodiment, based on a network shown in FIG. 7, a specific process of establishing a VSPT between a node S in a domain 1 and a node D in a domain 3 and releasing a resource is as follows:

Step 1: A PCE D1 forward determines that a domain sequence (Domain Sequence) is D1-D2-D3, where a method for determining the domain sequence is the prior art, which is not limited by this specific embodiment.

Figure 8:
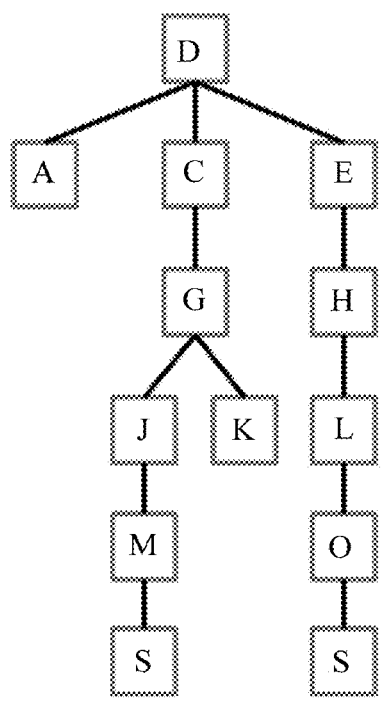
FIG. 8 is a schematic structural diagram of an established VSPT according to a specific embodiment of the present invention.

Step 2: A PCE of each domain establishes a VSPT according to a backward recursive path computation (BRPC) process, and a cost of a path from a root node (the node D) to each leaf node is updated in each VSPT update process. In the VSPT update process, if a cost of a path from the root node to a leaf node exceeds a cost threshold C, route computation on the leaf node is discontinued, and the branch does not grow. For example, as shown in FIG. 8, when it is found by computing that a cost of a path D-A has exceeded the cost threshold C, route computation in a direction of D-A is discontinued, and backward path establishment starting from A is not performed. After establishing a complete VSPT, the PCE D1 notifies a PCE D2 of the complete VSPT, and the PCE D2 sends the complete VSPT to a PCE D3. The complete VSPT is shown in FIG. 8.

Step 3: A PCE (the PCE D1) of the domain in which the source node S is located selects, according to the VSPT generated in step 2, a path whose cost is smallest as an optimal path, and establishes the optimal path. In this embodiment, it is assumed that the optimal path is S-O-L-H-E-D shown in FIG. 8.

Step 4: After the optimal path is established, the PCE (the PCE D1) of the domain in which the source node S is located modifies the VSPT obtained in step 2, that is, deletes a path branch in the VSPT that does not belong to the optimal path and that is in the present domain (D1) or between the present domain and a downstream neighboring domain (D2) (taking FIG. 8 as an example, deletes a path branch S-M in D1, and deletes a path branch M-J between the domains D1 and D2); at the same time, the PCE D1 releases a resource corresponding to the path branch that is pruned off, updates the resource to a traffic engineering database of the PCE D1, and sends a pruned VSPT to a PCE (the PCE D2) of the downstream neighboring domain.

Step 5: After receiving the VSPT from the PCE of the upstream neighboring domain, the PCE D2 deletes a path branch in the VSPT that does not belong to the optimal path and that is in the present domain or between the present domain and a downstream neighboring domain; at the same time, the PCE D2 releases a resource corresponding to the path branch that is pruned off, updates the resource to a TED of the PCE D2, and sends a pruned VSPT to a PCE (the PCE D3) of the downstream neighboring domain.

Step 6: After receiving the VSPT from the PCE of the upstream neighboring domain, the PCE D3 deletes a path branch in the present domain that does not belong to the optimal path; at the same time, the PCE D3 releases a resource corresponding to the path branch that is pruned off, and updates the resource to a TED of the PCE D3.

In a second specific embodiment, a process of establishing a VSPT and selecting an optimal path is the same as the process from step 1 to step 3 in the first specific embodiment. A difference is that after an optimal path is selected, a specific process of releasing a resource is different.

In this specific embodiment, after selecting the optimal path, a PCE (a PCE D1) of a domain in which a source node S is located sends, to an downstream neighboring domain, a message that carries the optimal path and a complete VSPT, and after a period of time ends, releases a resource occupied by a path branch in the VSPT that does not belong to the selected optimal path and that is in the present domain or between the present domain and the downstream neighboring domain.

After receiving the message from the PCE (the PCE D1) of the upstream neighboring domain, a PCE D2 forwards the message to a PCE (a PCE D3) of a downstream neighboring domain, obtains the optimal path and the VSPT that are carried in the message, and after a period of time ends, releases a resource occupied by a path branch in the VSPT that does not belong to the optimal path and that is in the present domain or between the present domain and the downstream neighboring domain.

After receiving the message from the PCE (the PCE D2) of the upstream neighboring domain, the PCE D3 obtains the optimal path and the VSPT that are carried in the message, and after a period of time ends, releases a resource occupied by a path branch in the VSPT that does not belong to the optimal path and that is in the present domain.

In VSPT processing processes provided by the following embodiments, a resource occupied by a path branch that is in an established VSPT and irrelevant to an optimal path is immediately released after the optimal path is determined, so as to reduce a resource occupation time and improve a resource utilization rate.

Figure 9:
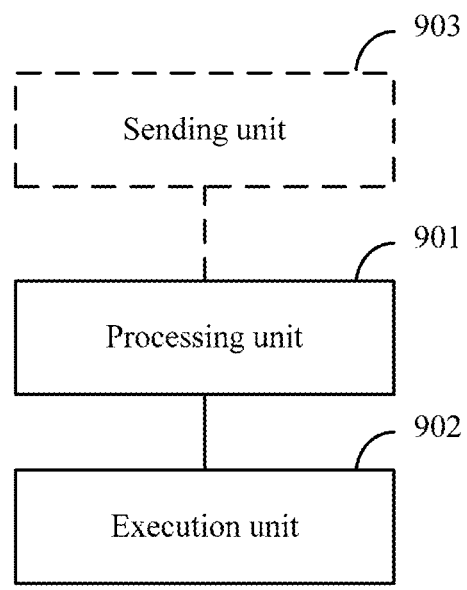
FIG. 9 is a schematic structural diagram of another PCE according to an embodiment of the present invention.

In a seventh embodiment of the present invention, a PCE is provided, and the PCE is a PCE of a domain in which a source node is located. As shown in FIG. 9, the PCE mainly includes:

a processing unit 901, configured to obtain a VSPT, and select an optimal path according to the VSPT, where a root node of the VSPT is a destination node, and a leaf node of the VSPT is the source node; and an execution unit 902, configured to release, according to the VSPT and the optimal path that are obtained by the processing unit 901, a resource occupied by a path branch in the VSPT that does not belong to the optimal path and that is in the domain in which the source node is located or between the domain in which the source node is located and a downstream neighboring domain.

In this embodiment, the PCE of a domain in which a source node is located immediately releases, according to a selected optimal path, a resource occupied by a branch in a VSPT that does not belong to the optimal path, instead of after a period of time ends, so that a duration in which a resource is occupied is reduced and a resource utilization rate is improved.

In a practical application, a manner of selecting an optimal path according to a VSPT is not an issue on which the present invention focuses, and the optimal path may be obtained by using an existing optimal path acquiring manner, which is not limited by the present invention.

During specific implementation, the execution unit updates the released resource to a TED of the PCE.

Preferably, the PCE further includes a sending unit 903, configured to:

send, to a PCE of the downstream neighboring domain in a domain sequence, a message that carries the VSPT and the optimal path that are obtained by the processing unit 901.

The VSPT may be established by using an existing BRPC manner, or may be established by using the VSPT establishment manners provided by the first to sixth embodiments. If the VSPT is established by using the VSPT establishment manners provided by the first to sixth embodiments, occupied resources may be further reduced, and a resource utilization rate is improved.

Figure 10:
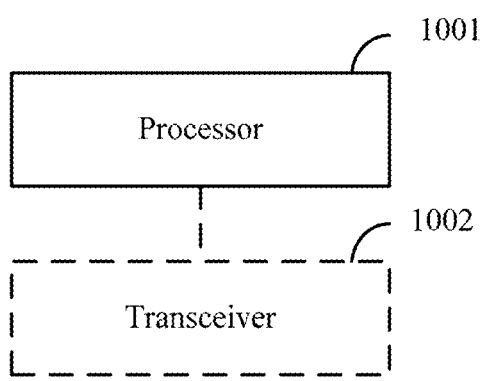
FIG. 10 is a schematic structural diagram of another PCE according to an embodiment of the present invention.

Corresponding to the PCE provided by the seventh embodiment, in an eighth embodiment of the present invention, another PCE is provided, and the PCE is configured to manage a domain in which a source node is located. As shown in FIG. 10, the PCE mainly includes:

a processor 1001, configured to obtain a VSPT, select an optimal path according to the VSPT, and release, according to the obtained VSPT and the optimal path, a resource occupied by a path branch in the VSPT that does not belong to the optimal path and that is in the domain in which the source node is located or between the domain in which the source node is located and a downstream neighboring domain.

A root node of the VSPT is a destination node, and a leaf node of the VSPT is the source node.

Preferably, a transceiver 1002 is further included, configured to send, to a PCE of the downstream neighboring domain in a domain sequence, a message that carries the VSPT and the optimal path that are obtained by the processor 1001.

In a practical application, a manner of selecting an optimal path according to a VSPT is not an issue on which the present invention focuses, and the optimal path may be obtained by using an existing optimal path acquiring manner, which is not limited by the present invention.

The VSPT may be established by using an existing BRPC manner, or may be established by using the VSPT establishment manners provided by the first to sixth embodiments. If the VSPT is established by using the VSPT establishment manners provided by the first to sixth embodiments, occupied resources may be further reduced, and a resource utilization rate is improved.

Figure 11:
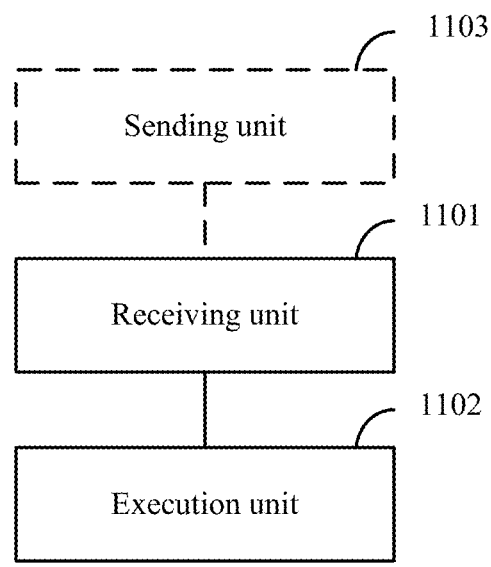
FIG. 11 is a schematic structural diagram of another PCE according to an embodiment of the present invention.

Based on a same invention concept, in a ninth embodiment of the present invention, another PCE is provided and configured to manage an intermediate domain other than domains in which a source node or a destination node is located. As shown in FIG. 11, the PCE mainly includes:

a receiving unit 1101, configured to receive a third message sent by a PCE of an upstream neighboring domain in a domain sequence, where the third message includes a VSPT and an optimal path from the source node to the destination node that are obtained by a PCE of a domain in which the source node is located, a root node of the VSPT is the destination node, and a leaf node of the VSPT is the source node; and an execution unit 1102, configured to release, according to the VSPT and the optimal path that are carried in the third message received by the receiving unit 1101, a resource occupied by a path branch in the VSPT that does not belong to the optimal path and that is in a domain corresponding to the PCE or between a domain corresponding to the PCE and a downstream neighboring domain in the domain sequence.

In this embodiment, the PCE of an intermediate domain other than domains in which a source node or a destination node is located immediately releases, according to a selected optimal path, a resource occupied by a path branch in a VSPT that does not belong to the optimal path, instead of after a period of time ends, so that a duration in which a resource is occupied is reduced and a resource utilization rate is improved.

Preferably, the PCE further includes a sending unit 1103, configured to:

send, to a PCE of the downstream neighboring domain in the domain sequence according to the VSPT and the optimal path that are carried in the third message received by the receiving unit 1101, a message that carries the VSPT and the optimal path.

The VSPT may be established by using an existing BRPC manner, or may be established by using the VSPT establishment manners provided by the first to sixth embodiments. If the VSPT is established by using the VSPT establishment manners provided by the first to sixth embodiments, occupied resources may be further reduced, and a resource utilization rate is improved.

Figure 12:
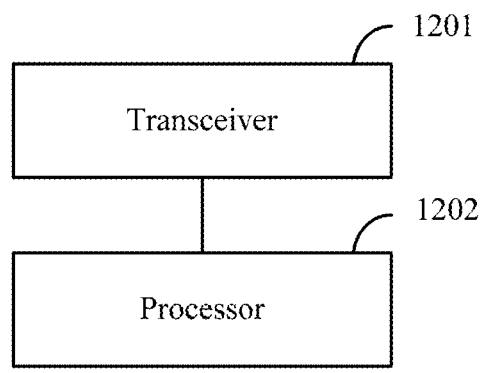
FIG. 12 is a schematic structural diagram of another PCE according to an embodiment of the present invention.

Corresponding to the PCE provided by the ninth embodiment, in a tenth embodiment of the present invention, another PCE is provided, and the PCE is configured to manage an intermediate domain other than domains in which a source node or a destination node is located. As shown in FIG. 12, the PCE mainly includes:

a transceiver 1201, configured to receive a third message sent by a PCE of an upstream neighboring domain in a domain sequence, where the third message includes a VSPT and an optimal path from the source node to the destination node that are obtained by a PCE of a domain in which the source node is located, a root node of the VSPT is the destination node, and a leaf node of the VSPT is the source node; and a processor 1202, configured to release, according to the VSPT and the optimal path that are carried in the third message received by the transceiver 1201, a resource occupied by a path branch in the VSPT that does not belong to the optimal path and that is in a domain corresponding to the PCE or between a domain corresponding to the PCE and a downstream neighboring domain in the domain sequence.

Preferably, the transceiver 1201 is further configured to send, to a PCE of the downstream neighboring domain in the domain sequence according to the VSPT and the optimal path that are carried in the third message, a message that carries the VSPT and the optimal path.

The VSPT may be established by using an existing BRPC manner, or may be established by using the VSPT establishment manners provided by the first to sixth embodiments. If the VSPT is established by using the VSPT establishment manners provided by the first to sixth embodiments, occupied resources may be further reduced, and a resource utilization rate is improved.

Figure 13:
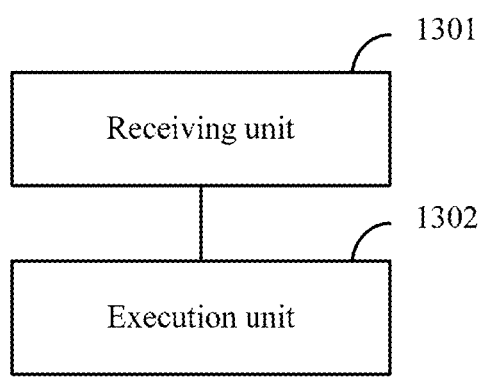
FIG. 13 is a schematic structural diagram of another PCE according to an embodiment of the present invention.

Based on a same invention concept, in an eleventh embodiment of the present invention, another PCE is provided, and the PCE is a PCE of a domain in which a destination node is located. As shown in FIG. 13, the PCE mainly includes:

a receiving unit 1301, configured to receive a fourth message sent by a PCE of an upstream neighboring domain in a domain sequence, where the fourth message includes a VSPT and an optimal path from a source node to the destination node that are obtained by a PCE of a domain in which the source node is located, a root node of the VSPT is the destination node, and a leaf node of the VSPT is the source node; and an execution unit 1302, configured to obtain the VSPT and the optimal path that are carried in the fourth message received by the receiving unit 1301, and release a resource occupied by a path branch in the VSPT that does not belong to the optimal path and that is in the domain in which the destination node is located.

The VSPT may be established by using an existing BRPC manner, or may be established by using the VSPT establishment manners provided by the first to sixth embodiments. If the VSPT is established by using the VSPT establishment manners provided by the first to sixth embodiments, occupied resources may be further reduced, and a resource utilization rate is improved.

Figure 14:
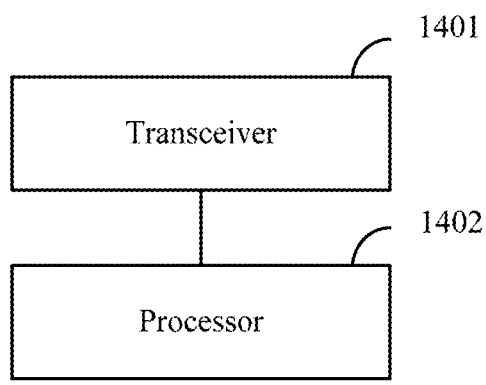
FIG. 14 is a schematic structural diagram of another PCE according to an embodiment of the present invention.

Corresponding to the PCE provided by the eleventh embodiment, in a twelfth embodiment of the present invention, another PCE is provided, and the PCE is configured to manage a domain in which a destination node is located. As shown in FIG. 14, the PCE mainly includes:

a transceiver 1401, configured to receive a fourth message sent by a PCE of an upstream neighboring domain in a domain sequence, where the fourth message includes a VSPT and an optimal path from a source node to the destination node that are obtained by a PCE of a domain in which the source node is located, a root node of the VSPT is the destination node, and a leaf node of the VSPT is the source node; and a processor 1402, configured to obtain the VSPT and the optimal path that are carried in the fourth message received by the transceiver 1401, and release a resource occupied by a path branch in the VSPT that does not belong to the optimal path and that is in the domain in which the destination node is located.

The VSPT may be established by using an existing BRPC manner, or may be established by using the VSPT establishment manners provided by the first to sixth embodiments. If the VSPT is established by using the VSPT establishment manners provided by the first to sixth embodiments, occupied resources may be further reduced, and a resource utilization rate is improved.

Figure 15:
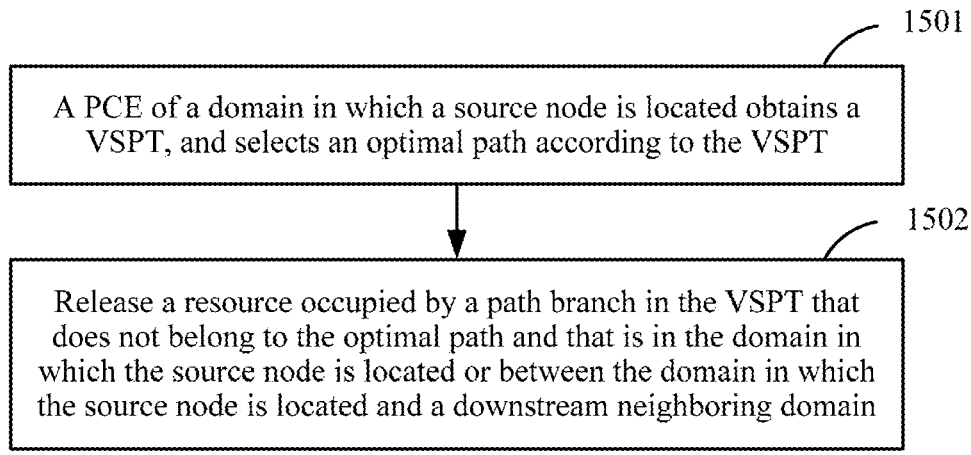
FIG. 15 is a schematic flowchart of a method for processing a VSPT by a PCE of a domain in which a source node is located according to an embodiment of the present invention.

Based on the PCEs provided by the seventh, the ninth, and the eleventh embodiments, or based on the PCEs provided by the eighth, the tenth, and the twelfth embodiments, in a thirteenth embodiment of the present invention, as shown in FIG. 15, a specific method process of processing a VSPT by a PCE of a domain in which a source node is located is as follows:

Step 1501: The PCE of the domain in which the source node is located obtains the VSPT, and selects an optimal path according to the VSPT.

A root node of the VSPT is a destination node, and a leaf node of the VSPT is the source node.

In a practical application, a manner of selecting an optimal path according to a VSPT is not an issue on which the present invention focuses, and the optimal path may be obtained by using an existing optimal path acquiring manner, which is not limited by the present invention.

Step 1502: Release a resource occupied by a path branch in the VSPT that does not belong to the optimal path and that is in the domain in which the source node is located or between the domain in which the source node is located and a downstream neighboring domain.

During specific implementation, the released resource occupied by the path branch is updated to a TED of the PCE.

Preferably, the PCE of the domain in which the source node is located sends, to a PCE of the downstream neighboring domain in a domain sequence, a message that carries the VSPT and the optimal path.

The VSPT may be established by using an existing BRPC manner, or may be established by using the VSPT establishment manners provided by the first to sixth embodiments. If the VSPT is established by using the VSPT establishment manners provided by the first to sixth embodiments, occupied resources may be further reduced, and a resource utilization rate is improved.

Figure 16:
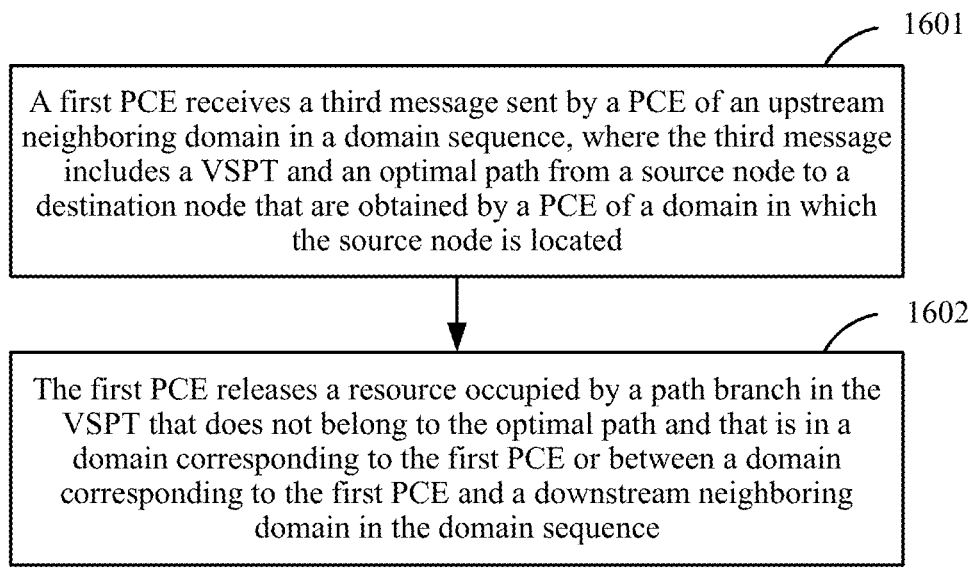
FIG. 16 is a schematic flowchart of a method for processing a VSPT by a PCE of an intermediate domain according to an embodiment of the present invention.

Based on a same invention concept, in a fourteenth embodiment of the present invention, as shown in FIG. 16, a specific method process of processing a VSPT by a PCE of an intermediate domain other than domains in which a source node or a destination node is located is as follows:

Step 1601: A first PCE receives a third message sent by a PCE of an upstream neighboring domain in a domain sequence, where the third message includes a VSPT and an optimal path from the source node to the destination node that are obtained by a PCE of a domain in which the source node is located.

A root node of the VSPT is the destination node, and a leaf node of the VSPT is the source node.

Step 1602: The first PCE releases a resource occupied by a path branch in the VSPT that does not belong to the optimal path and that is in a domain corresponding to the first PCE or between a domain corresponding to the first PCE and a downstream neighboring domain in the domain sequence.

During specific implementation, the released resource occupied by the path branch is updated to a TED of the first PCE.

Preferably, the first PCE sends, to a PCE of the downstream neighboring domain in the domain sequence, a message that carries the VSPT and the optimal path.

The VSPT may be established by using an existing BRPC manner, or may be established by using the VSPT establishment manners provided by the first to sixth embodiments. If the VSPT is established by using the VSPT establishment manners provided by the first to sixth embodiments, occupied resources may be further reduced, and a resource utilization rate is improved.

Figure 17:
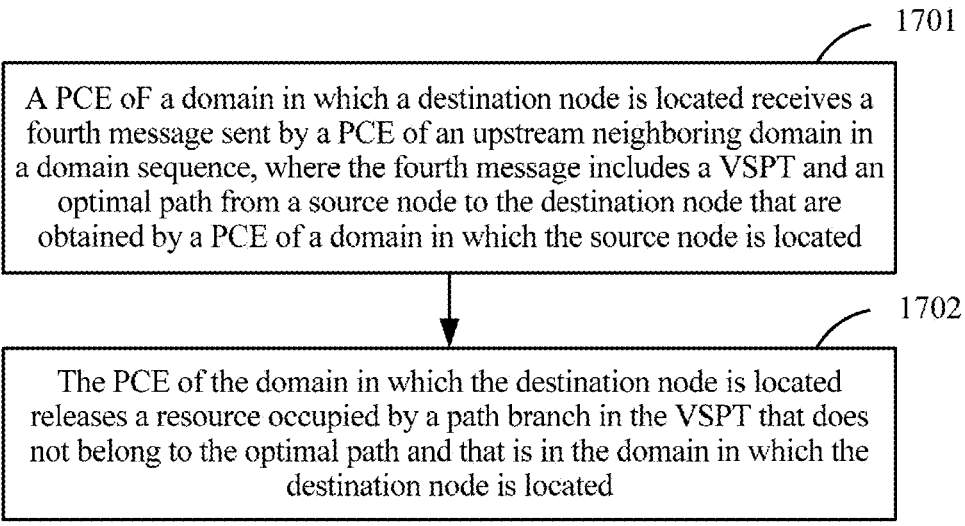
FIG. 17 is a schematic flowchart of a method for processing a VSPT by a PCE of a domain in which a destination node is located according to an embodiment of the present invention.

Based on a same invention concept, in a fifteenth embodiment of the present invention, as shown in FIG. 17, a detailed method process of processing a VSPT by a PCE of a domain in which a destination node is located is as follows:

Step 1701: The PCE of the domain in which the destination node is located receives a fourth message sent by a PCE of an upstream neighboring domain in a domain sequence, where the fourth message includes a VSPT and an optimal path from a source node to the destination node that are obtained by a PCE of a domain in which the source node is located.

A root node of the VSPT is the destination node, and a leaf node of the VSPT is the source node.

Step 1702: The PCE of the domain in which the destination node is located releases a resource occupied by a path branch in the VSPT that does not belong to the optimal path and that is in the domain in which the destination node is located.

During specific implementation, the released resource occupied by the path branch is updated to a TED of the PCE of the domain in which the destination node is located.

In this embodiment, after obtaining an optimal path, a PCE of a domain in which a destination node is located immediately releases, according to the optimal path, a resource occupied by a path branch that is irrelevant to the optimal path, instead of after a specified duration ends, so as to reduce a resource occupation time and improve a resource utilization rate.

The VSPT may be established by using an existing BRPC manner, or may be established by using the VSPT establishment manners provided by the first to sixth embodiments. If the VSPT is established by using the VSPT establishment manners provided by the first to sixth embodiments, occupied resources may be further reduced, and a resource utilization rate is improved.

The following describes in detail, by using a specific embodiment, the VSPT processing processes provided by the foregoing seventh to fifteenth embodiments.

In this specific embodiment, based on a network shown in FIG. 7, a specific process of establishing a VSPT between a node S in a domain 1 and a node D in a domain 3 and releasing a resource is as follows:

Step 1: A PCE corresponding to the source node S, that is, a PCE D1, sends a path computation request message (PCReq), where the path computation request message is used to request to compute an optimal path from S to D.

Step 2: The PCE D1 forward determines that a domain sequence (Domain Sequence) is D1-D2-D3.

Figure 18:
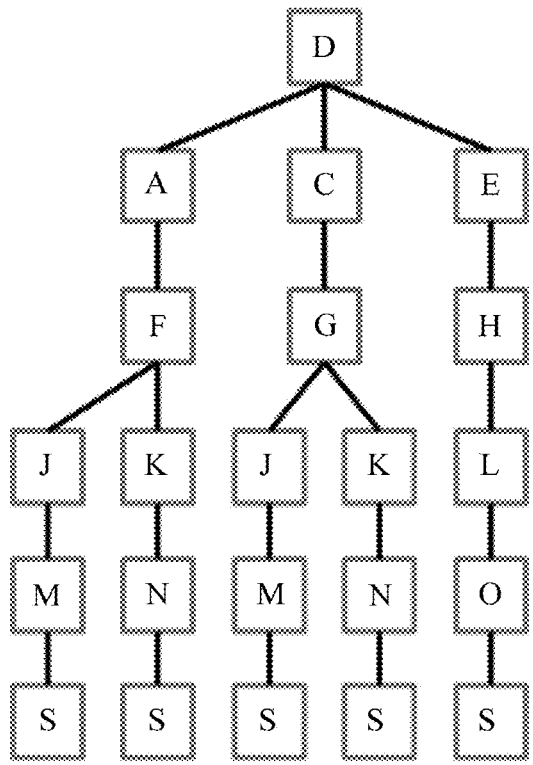
FIG. 18 is a schematic structural diagram of a VSPT obtained in a BRPC manner.

Step 3: Establish a VSPT in a BRPC manner, and the PCE of the domain in which the source node is located obtains a complete VSPT, where the VSPT is shown in FIG. 18.

Step 4: The PCE (the PCE D1) of the domain in which the source node S is located selects, according to the established VSPT, a path whose cost is smallest as the optimal path, and establishes the optimal path. It is assumed that the optimal path is S-O-L-H-E-D shown in FIG. 18.

Step 5: After the optimal path is established, the PCE (the PCE D1) of the domain in which the source node is located modifies the complete VSPT, that is, deletes a path branch in the VSPT that does not belong to the optimal path and that is in the present domain (D1) or between the present domain and a downstream domain (D2) (taking FIG. 18 as an example, deletes path branches S-M and S-N that are in D1, and deletes path branches M-J and N-K that are between D1 and D2), and sends a pruned VSPT to a PCE (a PCE D2) of the downstream neighboring domain; at the same time, the PCE D1 releases a resource occupied by the deleted path branch, updates the resource to a TED of the PCE D1; in addition, the PCE (the PCE D1) of the domain in which the source node is located sends, to the downstream neighboring domain, a message that carries the complete VSPT and the optimal path.

Step 6: The PCE (the PCE D2) of the downstream neighboring domain receives the message from the PCE D1, obtains the complete VSPT and the optimal path that are carried in the message, deletes a path branch in the VSPT that does not belong to the optimal path and that is in the present domain or between the present domain and a downstream neighboring domain, releases a resource occupied by the deleted path branch, updates the released resource to a TED of the PCE D2, and sends, to a PCE (a PCE D3) of the downstream neighboring domain, a message that carries the complete VSPT and the optimal path.

Step 7: The PCE D3 receives the message from the PCE D2, obtains the complete VSPT and the optimal path that are carried in the message, deletes a path branch in the VSPT that does not belong to the optimal path and that is in the present domain, releases a resource occupied by the deleted path branch, and updates the released resource to a TED of the PCE D3.

Based on the foregoing technical solution, in the VSPT establishment process provided by this embodiment of the present invention, in a process of establishing a VSPT, a cost of an established path from a root node (a destination node) to a leaf node is compared with a preset cost threshold, and when it is determined that the cost is less than the cost threshold, a new path branch is added to the established VSPT, so that path branches in the established VSPT are reduced, so as to reduce occupied resources and improve a resource utilization rate.

Based on the foregoing technical solution, in the VSPT processing process provided by this embodiment of the present invention, a resource occupied by a path branch that is in an established VSPT and irrelevant to an optimal path is immediately released after the optimal path is obtained, so as to reduce a resource occupation time and improve the resource utilization rate.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. In this case, the present invention is intended to cover these modifications and variations provided that they fall within the scope of protection defined by the following claims and their equivalent technologies.

What is claimed is:

1. A path computation element (PCE), comprising:
   a processor; and
   a computer readable medium having a plurality of computer executable instructions that, when executed by the processor, cause the processor to perform operations comprising:
   determining whether a cost of a path from a root node to a leaf node in a virtual shortest path tree (VSPT) obtained by a PCE of a downstream neighboring domain in a domain sequence is less than a cost threshold, wherein the root node is a destination node, the leaf node is a boundary node that is in the downstream neighboring domain and that has an inter-domain link with a domain in which a source node is located, the domain sequence is a sequence of domains passed from the source node to the destination node, the downstream refers to a direction from the source node to the destination node, and the PCE is a PCE of the domain in which the source node is located;
   adding a path branch from the leaf node to the source node to the VSPT when the cost of the path from the root node to the leaf node is less than the cost threshold, so as to obtain a new VSPT; and
   receiving a message that is sent by the PCE of the downstream neighboring domain and that carries the VSPT and the cost of the path from the root node to the leaf node in the VSPT, and obtaining the VSPT and the cost of the path from the root node to the leaf node in the VSPT.

2. The PCE according to claim 1, wherein the operations further comprise:
   selecting an optimal path from the source node to the destination node according to the new VSPT; and
   sending, to the PCE of the downstream neighboring domain, a message that carries the optimal path.

3. The PCE according to claim 2, wherein the operations further comprise:
   after the operation of selecting the optimal path, releasing a resource occupied by a path branch in the new VSPT that does not belong to the optimal path and that is in the domain in which the source node is located or between the domain in which the source node is located and the downstream neighboring domain.

4. The PCE according to claim 3, wherein the operations further comprise:
   after the operation of selecting the optimal path and after a specified duration ends, releasing the resource occupied by the path branch in the new VSPT that does not belong to the optimal path and that is in the domain in which the source node is located or between the domain in which the source node is located and the downstream neighboring domain.

5. A path computation element (PCE), comprising:
a processor; and
a computer readable medium having a plurality of computer executable instructions that, when executed by the processor, cause the processor to perform operations comprising:
determining whether a cost of a path from a root node to a leaf node in a virtual shortest path tree (VSPT) obtained by a PCE of a downstream neighboring domain in a domain sequence is less than a cost threshold, wherein the root node is a destination node, the leaf node is a boundary node that is in the downstream neighboring domain and that has an inter-domain link with a domain corresponding to the PCE, and the domain sequence is a sequence of domains passed from a source node to the destination node;
when the cost of the path from the root node to the leaf node is less than the cost threshold, adding, to the VSPT, a path branch from the leaf node to a boundary node that is in the domain corresponding to the PCE and that has an inter-domain link with an upstream neighboring domain in the domain sequence, so as to obtain a new VSPT; the downstream refers to a direction from the source node to the destination node, and the upstream refers to a direction from the destination node to the source node;
sending a first message to a PCE of the upstream neighboring domain, wherein the first message comprises the new VSPT and a cost of a path from the root node to a leaf node of the new VSPT; and
receiving a second message sent by the PCE of the upstream neighboring domain, wherein the second message comprises an optimal path from the source node to the destination node that is selected by a PCE of a domain in which the source node is located.

6. The PCE according to claim 5, wherein the second message further comprises a new VSPT obtained by the PCE of the domain in which the source node is located; and
the operations further comprise:
obtaining the optimal path and the new VSPT obtained by the PCE of the domain in which the source node is located that are in the second message, and releasing a resource occupied by a path branch that does not belong to the optimal path and that is in the new VSPT obtained by the PCE of the domain in which the source node is located and that is in the domain corresponding to the PCE or between the domain corresponding to the PCE and the downstream neighboring domain.

7. The PCE according to claim 6, wherein the operations further comprise:
obtaining the optimal path and the new VSPT obtained by the PCE of the domain in which the source node is located that are in the second message, and after a specified duration ends, releasing the resource occupied by the path branch that does not belong to the optimal path and that is in the new VSPT obtained by the PCE of the domain in which the source node is located and that is in the domain corresponding to the PCE or between the domain corresponding to the PCE and the downstream neighboring domain.

8. A virtual shortest path tree establishment method, comprising:
determining, by a path computation element (PCE) of a domain in which a source node is located, whether a cost of a path from a root node to a leaf node in a virtual shortest path tree (VSPT) obtained by a PCE of a downstream neighboring domain in a domain sequence is less than a cost threshold, wherein the root node is a destination node, the leaf node is a boundary node that is in the downstream neighboring domain and that has an inter-domain link with the domain in which the source node is located, and the domain sequence is a sequence of domains passed from the source node to the destination node; and
adding, by the PCE of the domain in which the source node is located, a path branch from the leaf node to the source node to the VSPT if the cost of the path from the root node to the leaf node is less than the cost threshold, so as to obtain a new VSPT,
wherein the downstream refers to a direction from the source node to the destination node, and
wherein the method further comprises:
receiving, by the PCE of the domain in which the source node is located, a message that is sent by the PCE of the downstream neighboring domain and that carries the VSPT and the cost of the path from the root node to the leaf node in the VSPT.

9. The method according to claim 8, wherein the method further comprises:
selecting, by the PCE of the domain in which the source node is located, an optimal path from the source node to the destination node according to the new VSPT, and sending, to the PCE of the downstream neighboring domain, a message that carries the optimal path.

10. The method according to claim 9, wherein the method further comprises:
after the PCE of the domain in which the source node is located selects the optimal path, releasing a resource occupied by a path branch in the new VSPT that does not belong to the optimal path and that is in the domain in which the source node is located or between the domain in which the source node is located and the downstream neighboring domain.

11. The method according to claim 10, wherein the method further comprises:
after the PCE of the domain in which the source node is located selects the optimal path and after a specified duration ends, releasing the resource occupied by the path branch in the new VSPT that does not belong to the optimal path and that is in the domain in which the source node is located or between the domain in which the source node is located and the downstream neighboring domain.

12. A virtual shortest path tree establishment method, comprising:
determining, by a first path computation element (PCE), whether a cost of a path from a root node to a leaf node in a virtual shortest path tree (VSPT) obtained by a PCE of a downstream neighboring domain in a domain sequence is less than a cost threshold, wherein the root node is a destination node, the leaf node is a boundary node that is in the downstream neighboring domain and that has an inter-domain link with a domain corresponding to the first PCE, and the domain sequence is a sequence of domains passed from a source node to the destination node; and
if the cost of the path from the root node to the leaf node is less than the cost threshold, adding, by the first PCE and to the VSPT, a path branch from the leaf node to a boundary node that is in the domain corresponding to the first PCE and that has an inter-domain link with an upstream neighboring domain in the domain sequence, so as to obtain a new VSPT, wherein the downstream refers to a direction from the source node to the destination node, and the upstream refers to a direction from the destination node to the source node, and wherein the method further comprises:
sending, by the first PCE, a first message to a PCE of the upstream neighboring domain, wherein the first message comprises the new VSPT and a cost of a path from the root node to a leaf node of the new VSPT; and
receiving, by the first PCE, a second message sent by the PCE of the upstream neighboring domain, wherein the second message comprises an optimal path from the source node to the destination node that is selected by a PCE of a domain in which the source node is located.

13. The method according to claim 12, wherein the second message further comprises a new VSPT obtained by the PCE of the domain in which the source node is located; and the method further comprises:
obtaining, by the first PCE, the optimal path in the second message, and releasing a resource occupied by a path branch that does not belong to the optimal path and that is in the new VSPT obtained by the PCE of the domain in which the source node is located and that is in the domain corresponding to the first PCE or between the domain corresponding to the first PCE and the downstream neighboring domain.

14. The method according to claim 13, wherein the method further comprises:
after the first PCE obtains the optimal path in the second message and after a specified duration ends, releasing the resource occupied by the path branch that does not belong to the optimal path and that is in the new VSPT obtained by the PCE of the domain in which the source node is located and that is in the domain corresponding to the first PCE or between the domain corresponding to the first PCE and the downstream neighboring domain.

* * * * *